United States Patent [19]

Stanwood et al.

[11] 4,279,275
[45] Jul. 21, 1981

[54] MECHANICAL JOINDER OF COMPOSITE SHAFT TO METALLIC END MEMBERS

[75] Inventors: Jay W. Stanwood, Long Beach; William A. Clarke, Irvine; Johannes MacLeane, Chino, all of Calif.

[73] Assignee: Ford Aerospace & Communications Corporation, Detroit, Mich.

[21] Appl. No.: 64,300

[22] Filed: Aug. 6, 1979

[51] Int. Cl.³ .............................................. F16L 47/02
[52] U.S. Cl. ..................................... 138/109; 64/1 S; 285/238; 403/359
[58] Field of Search .................. 138/109; 64/1 R, 1 S, 64/9 R; 285/238; 403/359, 289

[56] References Cited

U.S. PATENT DOCUMENTS

| | | |
|---|---|---|
| 1,990,990 | 2/1935 | Hathorn ............................ 403/359 X |
| 3,661,670 | 5/1972 | Pierpont, Jr. . |
| 3,844,730 | 10/1974 | Laussermair . |
| 3,881,973 | 6/1975 | Pinckney . |
| 4,009,066 | 2/1977 | Lachenmayer . |
| 4,089,190 | 5/1978 | Worgan et al. . |

Primary Examiner—William D. Martin, Jr.
Attorney, Agent, or Firm—Edward J. Radlo; Clifford L. Sadler

[57] ABSTRACT

An apparatus for joining a composite material shaft, such as a graphite epoxy or fiber glass driveshaft, to a metal end member is disclosed, wherein said joint is capable of withstanding large ranges of temperature and humidity, can handle high torque and has high resistance to fatigue. The design of parallel grooves on the end of a metallic sleeve concentrically aligned within the shaft is amenable to mass production. The first layer of fibers of the composite material shaft is preferably wound perpendicular to the orientation of the grooves. On the other end of the metallic sleeve is carved a scalloped pattern which facilitates concentric alignment of the sleeve on the tooling mandrel and helps to reduce shear stress between the sleeve and shaft. A method for mass production of shafts with metallic end joints attached employs an elongated spinning mandrel and pre-preg tape wound at high speed.

6 Claims, 8 Drawing Figures

MECHANICAL JOINDER OF COMPOSITE SHAFT TO METALLIC END MEMBERS

BACKGROUND OF THE INVENTION

1. Field of the Invention

This invention is an apparatus for mechanically joining a shaft fabricated of a composite material, e.g., graphite epoxy or fiber glass, to a metallic end connection, such as a portion of a universal joint. The invention has applicability wherever it is desired to transfer torque from a composite cylinder to a metal, such as in the driveshaft of an automobile, truck, or helicopter.

2. Description of the Prior Art

U.S. Pat. No. 4,009,066 discloses a method for making tubes with stoppers.

U.S. Pat. No. 3,844,730 shows a metal tube inside a plastic tube. There is no keying of the plastic to the metal as in the present invention. The patentee is not transmitting torque from the plastic to the metal as in the present invention.

U.S. Pat. No. 4,089,190 discloses a composite material driveshaft but does not include a description of the transition of the driveshaft to metallic end members, which is the subject matter of the present invention.

SUMMARY OF THE INVENTION

The present invention concerns a mechanical joinder between a shaft (such as a hollow driveshaft for an automobile, truck, or helicopter) comprised of a composite material, such as graphite epoxy or fiber glass, and a metallic end member such as part of a universal joint. Since torque must be delivered between the driveshaft and the end member, novel techniques must be employed beyond those normally associated with a composite-to-composite joint or a metal-to-metal joint. The present invention employs a large number of parallel subsurface channels or grooves which are cut or introduced by forming methods into a metallic sleeve portion of the metallic end member. The first layer of fibers of the composite material shaft is then wound within or across these grooves, and subsequent layers are wound preferably perpendicular to each other. The shaft is cured, with the fiber-groove interface providing mechanical compaction as well as adhesive bonding to withstand the high shear forces encountered when torque is applied between the shaft and the metallic sleeve.

The ungrooved end of the metallic sleeve is cut in a rosette or scalloped pattern and the sleeve is also tapered at this end. The rosettes can be crimped down upon the tooling mandrel during fabrication to facilitate concentric alignment of the metallic sleeve about the tooling mandrel. The scalloped pattern also provides for friction to withstand the shear forces that are present at that end of the shaft-sleeve joint.

A plurality of such shafts can be mass produced by positioning double-sleeve structures at appropriate intervals along an elongated tooling mandrel whose length is equal to several shafts when placed end-to-end. The shafts are fabricated about the metallic sleeves by laying the composite fibers in the appropriate orientation, curing the composite, removing the mandrel, and cutting the shafts at midpoints of the double-sleeves.

BRIEF DESCRIPTION OF THE DRAWINGS

These and other more detailed and specific objects and features of the present invention are more fully disclosed in the following specification, reference being had to the accompanying drawings, in which.

DESCRIPTION OF THE PREFERRED EMBODIMENTS

Figure 1:
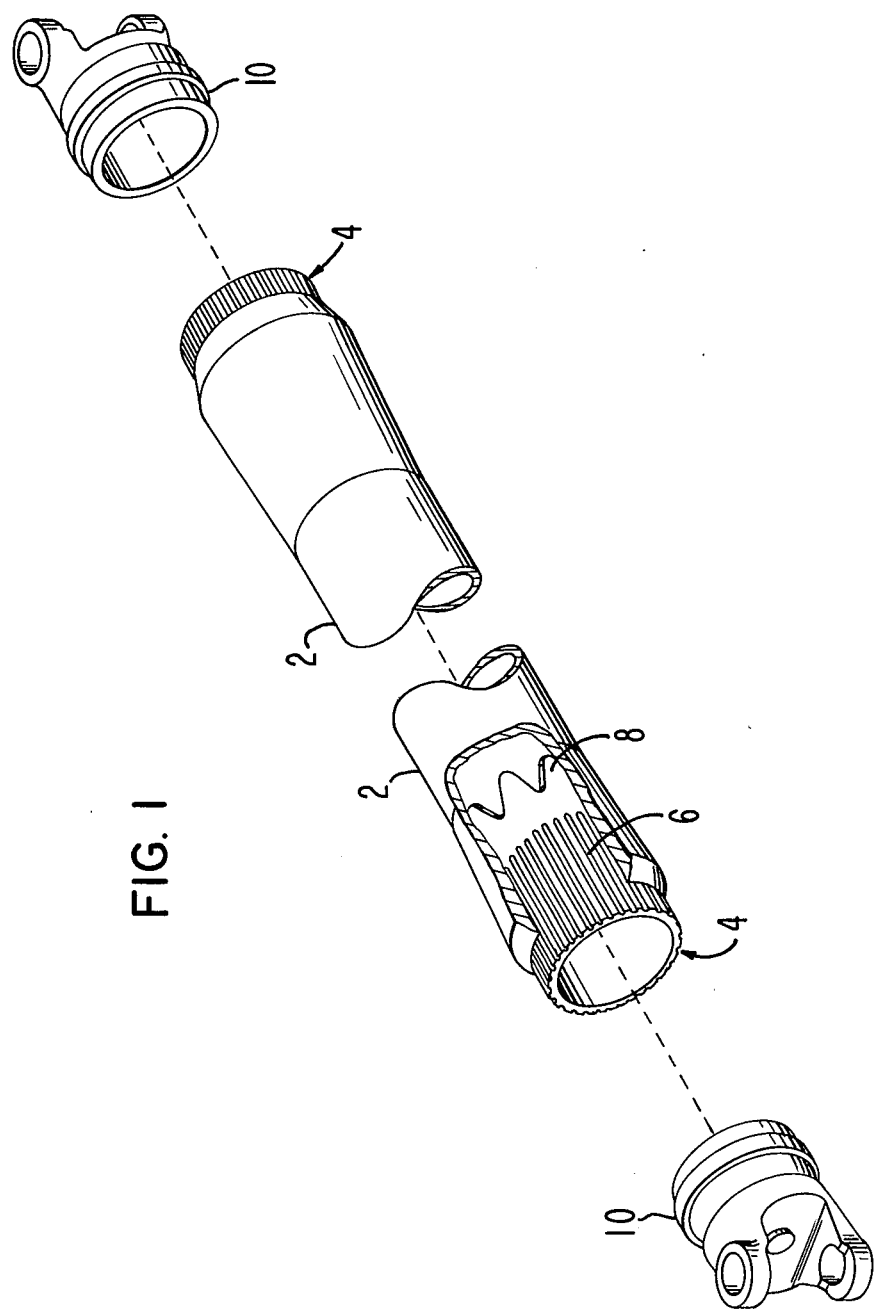
FIG. 1 is a partially cut away illustration of the present invention.

FIG. 1 is a partially cut away view showing the present invention. Shaft 2 is a hollow cylindrical shaft fabricated of a composite material, such as graphite epoxy or fiber glass. It is lighter than steel, yet can be fabricated so as to exhibit good properties of rigidity and vibration dampening. The shaft illustrated is employed as a driveshaft for a motor vehicle. As such, the shaft and its junction to metallic end members 10 must meet certain requirements, for example, capability of operation in temperature ranges of from −40° F. to 300° F. at humidity ranges up to 100% relative humidity. The shaft should be able to deliver a torque of up to 2000 foot-pounds and be so resistant to fatigue as to withstand 150,000 consecutively reversed spins at a maximum amplitude of 1000 foot-pounds each spin.

End members 10 can be yoke portions of universal joints. The shaft is normally connected to such end members at both ends thereof, as shown in FIG. 1. The end members are normally fabricated of steel because they are too complicated structurally to warrant being made of composite material.

Item 4 is a metallic sleeve portion of end member 10. Sleeve 4 can be fabricated as a portion of end member 10 or these can be separate pieces which are welded to each other by conventional metal-to-metal welding techniques. The technique of bonding the metal sleeve 4 to the shaft 2, however, is not a simple one because of the differences in composition of the materials to be joined.

At the yoke end of each sleeve 4 is a series of parallel grooves 6 which are knurled or otherwise cut or machined into the sleeve. FIG. 1 illustrates the embodiment in which the grooves extend all the way to the end of sleeve 4; alternatively, as illustrated in FIGS. 2, 3, 4, and 8, the very end of sleeve 4 could be kept ungrooved; for example, the portion of sleeve 4 protruding beyond shaft 2 could remain ungrooved. At the non-yoke end of sleeve 4, the metal has been tapered and cut into a rosette or scalloped pattern, as will be more fully explained below.

Shaft 2 is typically fabricated of two different materials. The first material is a high strength and high modulus set of fibers, for example graphite, glass, or boron. The second material is a matrix or adhesive, for example epoxy, plastic resin, or a phenolic. The composite material can be such as to cure in stages. It is sometimes fabricated in an uncured or partially cured form in the form of a tape having a single row of fibers aligned parallel to each other embedded in the matrix material. In this form, it is referred to as a pre-impregnated tape, or pre-preg.

Figure 2:
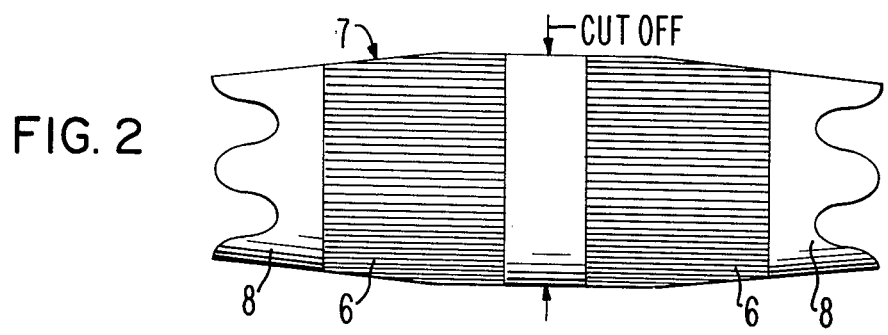
FIG. 2 is a side view of one embodiment of a double metallic-sleeve structure of the present invention before being cut.

FIG. 2 is a side view of one embodiment of a double-sleeve structure 7. The sleeves have been machined in joined quantities of two to facilitate mass production. They will later be severed along the line illustrated. Near the point of joinder, the sleeves are free of grooves; however, subsurface channels or grooves 6 occupy a large portion of the surface area of double-sleeve 7. The grooves are aligned parallel to each other, are closely spaced, and have a radius of approximately one to four times that of the fibers employed in composite shaft 2. In the embodiment illustrated in FIG. 2, the grooves are aligned along the axis of rotation of the shaft and sleeves. However, other configurations could be employed, such as those illustrated in FIGS. 3 and 4, wherein the grooves are aligned at a 45° angle with respect to this axis of rotation. The grooves could even be perpendicular to the axis of rotation. The FIGS. 3 and 4 embodiment is particularly well suited to mass production because it facilitates the subsequent rapid laying of successive perpendicular layers of pre-preg tape along the entire length of the shaft-to-be (see below).

Figure 3:
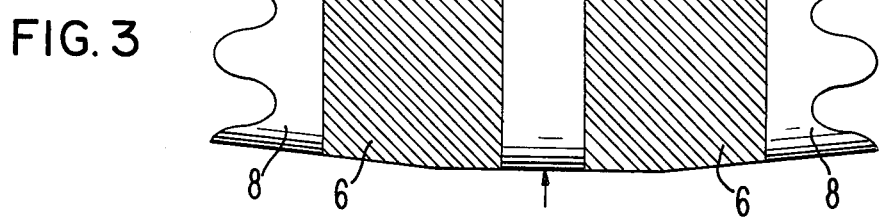
FIG. 3 is a side view of an alternative embodiment of a double metallic-sleeve structure of the present invention before being cut.

Typically, the inner diameter of double-sleeve 7 is approximately three (3) inches. At its midpoint the thickness of the metal is approximately one tenth (1/10) of an inch. This thickness is tapered down towards the outer or scalloped ends 8 to approximately 0.025 inch (FIGS. 2, 3, and 4 are not drawn to scale).

Figure 7:
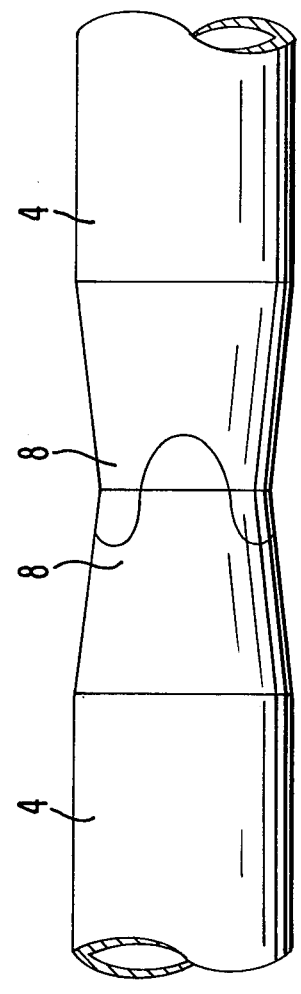
FIG. 7 is a side view of a material-saving technique of fabricating the metallic sleeves of the present invention.

FIG. 7 illustrates a method for fabricating sleeves wherein no metal is wasted in fabricating the rosettes. After tapering a long cylinder of metal in the region of the junction of two double-sleeves, a sinusoidal or other axi-symmetrical cut is made along the circumference of the cylinder at the junction, resulting in two identically-scalloped double-sleeve ends 8. It may be preferable to have the rosette region of the double-sleeve be cylindrically shaped at the reduced thickness, to insure that the rosettes do not thicken at their tips.

The purpose of fabricating ends 8 in the form of tapered scallops is to provide a flexible (or compliant) structure for reducing the shear stress between the shaft and the sleeve at the end of the sleeve; to facilitate concentric alignment of the sleeve on the tooling mandrel by means of bending in the thin scallops; to protect this end of the sleeve; and to provide a large surface area for the placement of counterweights as necessary to balance the sleeve about its axis of rotation so as to minimize vibration in the final shaft assembly.

Figure 4:
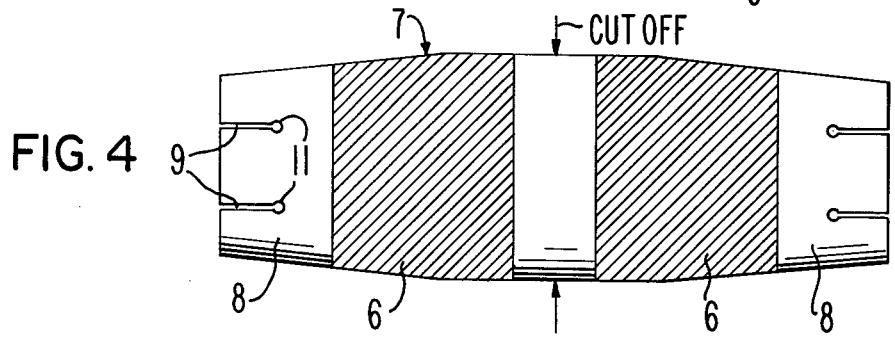
FIG. 4 is a side view of a third embodiment of a double metallic-sleeve structure of the present invention before being cut.
Figure 8:
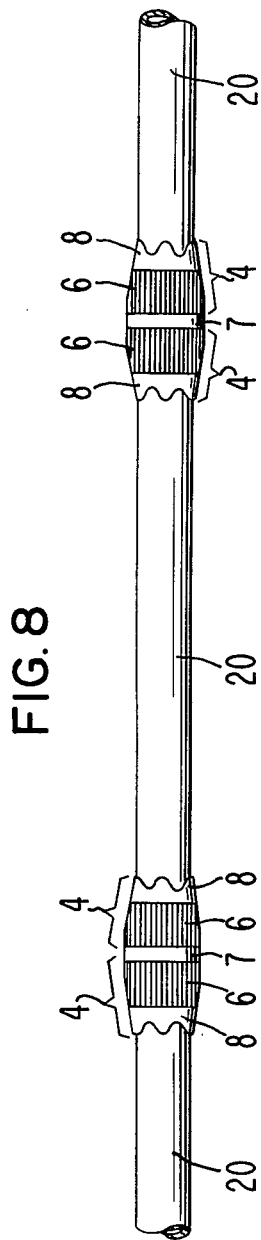
FIG. 8 is an illustration showing the sleeves of the present invention on a tooling mandrel during the fabrication process.

As an alternative to the sinusoidally shaped rosettes illustrated in FIGS. 1, 2, 3, and 7, one could employ a more scalloped-shaped pattern as in FIG. 8 or the simpler straight-out pattern of FIG. 4, in which a plurality of straight slits 9 are slotted, sawed, or otherwise cut into the rosette ends 8 of sleeves 4. At the end of each slit a hole 11 is drilled or punched to inhibit undesired lengthening of slits 9. This technique is quite amenable to mass production.

Figure 5:
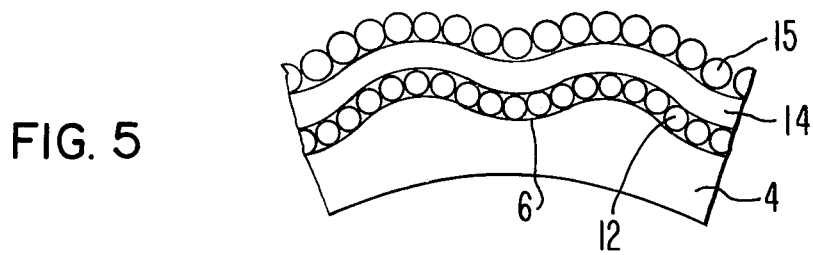
FIG. 5 is a cross-sectional view of one embodiment of the first two layers of fiber compacted into the grooves of a metallic sleeve of the present invention.
Figure 6:
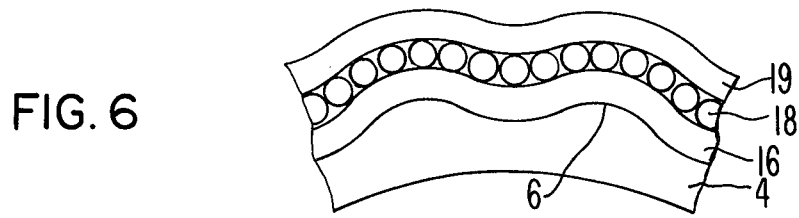
FIG. 6 is a cross-sectional view of an alternative embodiment of the first two layers of fiber compacted into the grooves of a metallic sleeve of the present invention.

FIGS. 5 and 6 illustrate two embodiments of orienting the fibers of the composite shaft with respect to the grooves of the sleeves. The views are cross-sections cut transverse the groove direction and are equally applicable to the embodiments illustrated in FIGS. 2, 3, and 4.

In FIG. 5 a first layer of fibers has been laid parallel to and within the grooves 6. This layer is illustrated as ends 12 of fibers. Then a second layer of fibers 14 is laid, preferably perpendicular to the first layer. This orientation inhibits the splitting of fibers and makes for firm compaction of fibers into the grooves.

FIG. 6 illustrates an alternative embodiment wherein the first layer 16 of fibers is laid perpendicular to the orientation of the grooves 6. Then a second layer 18 is laid perpendicular to the first layer and a third layer 19 is laid perpendicular to the second. The second and subsequent layers tend to force the first layer into the grooves. This configuration of subsurface channels assures mechanical keying of reinforcing fibers in compaction without the loss in compaction and inherent fiber splitting produced from above-surface protrusion mechanical keying. This structure also reduces the resin adhesion dependence of the metal-to-composite joint, resulting in lower risk from resin surface degradation when the sleeve is assembled with an interference fit to the weld yoke, and from the heat conduction into the metal-to-composite joint when the sleeve is welded to the yoke in production.

There are two basic methods of placing the layers of fibers into the grooves. The first is a wet method wherein the fibers are first laid and then the whole structure is dipped into a liquidous matrix. A second method is a pre-preg method wherein one or more layers of fibers preimpregnated in a tape of uncured or semicured matrix are wound onto the grooves, followed by curing.

FIG. 8 illustrates a preferred embodiment for mass producing shafts with such metallic end members. A tooling mandrel 20, which is about thirty or forty feet long, has an outer diameter slightly less than the inner diameter of the double-sleeves 7 selected. The mandrel is typically fabricated of aluminum, steel or wood, and should have a different thermal coefficient of expansion than the metal comprising double-sleeve 7 and composite material 2 so as to facilitate separation of the mandrel from the completed shafts. The mandrel may be overcoated with a release layer such as Teflon (TM) for this purpose. The mandrel should be rigid enough not to bow when positioned horizontally. Several double-sleeves 7 are positioned along the horizontal mandrel at locations which correspond to the desired length of the shafts. At the ends of the mandrel, single sleeves 4 rather than double-sleeves are employed. If the shafts are to be six feet in length it is seen that at least five shafts can be fabricated simultaneously on one mandrel which is about 30 feet in length.

The scalloped ends 8 of the sleeves are then crimped onto the mandrel to facilitate concentric alignment therewith. The sleeves can be balanced by performing measurements on the spinning mandrel and adding counterweights to the rosettes as necessary. Grooves are knurled or machined into the sleeves if this has not already been done. A high peel strength adhesive tape, such as one containing nitro phenolic, is wrapped over the rosette portions 8 of all the sleeves. A different type of preimpregnated composite tape, one with a high temperature resistant adhesive such as resin or epoxy phenolic, is wound at high speed over all or most of the length of the mandrel 20 by spinning the mandrel and transversely moving the unwinding tape along the axis of rotation of the mandrel. This tape when cured becomes the shafts. It may be desirable to wind extra layers of tape at points midway between the sleeves so the shafts will bulge slightly in their centers, inhibiting bowing tendencies.

The composite material is then cured by heating, typically for approximately 45 minutes at 465° F. During this time the mandrel continues spinning so that the matrix will flow circumferentially uniformly throughout the shafts. The mandrel is then slid out of the end-to-end shaft assembly, which is cooled to room temperature. The individual shafts are formed by cutting the double-sleeves at their midpoints. Then the metal sleeves 4 are welded onto the end yokes 10.

Alternatively, the yokes could be fabricated as a single piece with the sleeves initially, which would avoid the problem of fabricating metal-to-metal bonds between sleeves 4 and yokes 10.

The above description is included to illustrate the operation of the preferred embodiments and is not meant to limit the scope of the invention. The scope of the invention is to be limited only by the following claims. From the above discussion many variations will be apparent to one skilled in the art that would yet be encompassed by the spirit and scope of the invention.

What is claimed is:

1. A metal/composite joint comprising:
an outer hollow cylindrical tube fabricated of fiber-adhesive composite material;
a cylindrical metallic sleeve having inner and outer ends and fitting within a terminus of said outer tube so that said outer end is approximately aligned with said terminus and said inner end extends part way within said tube, with high shear friction between said sleeve and tube;
said sleeve having a single series of several elongated parallel grooves formed in the outer periphery of said sleeve in the vicinity of its outer end wherein said grooves are closely spaced, so that an end of each groove is substantially continuous with a beginning of an adjacent groove;
wherein fibers from said composite material are compacted into said grooves, each of said grooves having a radius of between approximately one and four times the radius of said fibers;
wherein the grooves are aligned at a 45° angle with respect to the axis of rotation of the sleeve and tube.

2. A metal/composite joint comprising:
an outer hollow cylindrical tube fabricated of fiber-adhesive composite material;
a cylindrical metallic sleeve having inner and outer ends and fitting within a terminus of said outer tube so that said outer end is approximately aligned with said terminus and said inner end extends part way within said tube with high shear friction between said sleeve and tube;
said sleeve having a plurality of elongated parallel grooves formed in the outer periphery of said sleeve in the vicinity of its outer end;
wherein the perimeter of the inner end of said sleeve follows a substantially sinusoidal pattern circumferentially along said inner end.

3. The apparatus of claim 2 wherein the sleeve is thinner at its inner end than at its outer end.

4. Apparatus of claim 1 wherein said composite material comprises a set of high strength and high modulus fibers and a matrix adhesive.

5. Apparatus of claim 1 wherein a first layer of said fibers is wound parallel to and within said grooves and a second layer of said fibers is wound perpendicular to said first layer.

6. Apparatus as in claim 1 wherein a first layer of said fibers is wound perpendicular to said grooves and a second layer of said fibers is wound perpendicular to said first layer.

* * * * *